US012551052B2

(12) United States Patent
Monti (10) Patent No.: US 12,551,052 B2
(45) Date of Patent: Feb. 17, 2026

(54) MULTI-PURPOSE ESPRESSO MACHINE GROUP HEAD CLEANING TOOL

(71) Applicant: Steven Monti, Cumberland, RI (US)

(72) Inventor: Steven Monti, Cumberland, RI (US)

( * ) Notice: Subject to any disclaimer, the term of this patent is extended or adjusted under 35 U.S.C. 154(b) by 664 days.

(21) Appl. No.: 17/938,972

(22) Filed: Sep. 7, 2022

(65) Prior Publication Data
US 2023/0157481 A1    May 25, 2023

Related U.S. Application Data

(60) Provisional application No. 63/282,149, filed on Nov. 22, 2021.

(51) Int. Cl.
*A47J 31/60* (2006.01)
*A46B 5/02* (2006.01)
*A46B 9/02* (2006.01)

(52) U.S. Cl.
CPC .............. *A47J 31/60* (2013.01); *A46B 5/021* (2013.01); *A46B 9/02* (2013.01); *A46B 2200/30* (2013.01)

(58) Field of Classification Search
CPC ....... A46B 5/021; A46B 9/02; A46B 2200/30; A46B 9/028; A46B 9/026; A46B 15/0055; A46B 2200/405; A47J 31/60
See application file for complete search history.

(56) References Cited

U.S. PATENT DOCUMENTS

| | | | | |
|---|---|---|---|---|
| 2,350,469 A | * | 6/1944 | Litka | A46B 11/063 401/289 |
| 4,381,766 A | * | 5/1983 | Avolio | A47K 7/028 15/210.1 |
| 2012/0168535 A1 | * | 7/2012 | Chen | A47L 1/08 239/532 |
| 2015/0289637 A1 | * | 10/2015 | Vasilakes | A46B 9/06 15/207.2 |
| 2016/0016293 A1 | * | 1/2016 | Matsushita | B24D 3/344 51/298 |
| 2020/0086471 A1 | * | 3/2020 | Urrutia | B23B 45/06 |

* cited by examiner

*Primary Examiner* — Andrew A Horton
(74) *Attorney, Agent, or Firm* — Alloy Patent Law; Walker Griffin Weitzel (57) ABSTRACT

Presented is a multi-purpose cleaning tool for cleaning a group head of an espresso machine. The multi-purpose cleaning tool includes a top element and a bottom element. A ring brush and a centre textile disk cleaning pad are disposed on the first side of the top element. A central plate is positioned between the first side and the opposite second side of the bottom element. An inspection mirror is removably positioned below the central plate. A central hole is positioned substantially above the central plate wherein the central hole holds a hex shaft tool bit. Each of the top element and the bottom element includes a mating arrangement that enables the top element and the bottom element to be removably connected to each other.

12 Claims, 8 Drawing Sheets

MULTI-PURPOSE ESPRESSO MACHINE GROUP HEAD CLEANING TOOL

CROSS-REFERENCE TO RELATED PATENT DOCUMENTS

This patent application claims the benefit of priority of U.S. Provisional Application No. 63/282,149, entitled "MULTI-PURPOSE ESPRESSO MACHINE GROUP HEAD CLEANING TOOL," filed 22 Nov. 2021, which is hereby incorporated herein by reference in its entirety.

TECHNICAL FIELD

The present invention generally relates to cleaning tools and more particularly, the present invention relates to a hand-held tool for cleaning group head of an espresso machine as well as for various other purposes associated with an espresso machine.

BACKGROUND

Espresso machines are well known type of devices that brew coffee by forcing pressurized water through a "puck" of ground coffee and a filter to produce a thick, concentrated coffee called espresso. A Typical espresso machine comprises components such as but not limited to: group head, filter and so on. The group head, also referred to as "espresso machine group", "brew group", or "brew head" is a component of the espresso machine that dispenses pressurized water into the filter (or "portafilter") that holds the coffee grounds to produce espresso coffee.

Repeated usage of espresso machines requires frequent cleaning of the various components of the espresso machine to ensure a high-quality espresso product. Residue from the espresso brewing process will impart unpleasant flavours, so it is important to remove any build-up of espresso or grinds. Generally, group heads are required to be cleaned frequently to maintain the quality of the espresso.

Espresso machines typically are operated at either counter or bar height. The group head is positioned, with relation to the drip-tray and body of the espresso machine, such that it is very difficult to view many of the surfaces that are susceptible to build-up. Particularly, residue and grinds will accumulate on the dispersion screen and gasket that seals the portafilter to the group head. Furthermore, the geometry of the group head is particularly difficult to clean using conventional tools.

Various methods have been used to clean group heads of the espresso machine. Often, a barista will employ a towel and/or small brush to clean the group head shower/dispersion screen surface. Towels tend to impart a burn risk, as many of the surfaces are very hot. These methods require an iterative sequence of cleaning and inspections to ensure a clean surface area of the group head shower/dispersion screen surface. This approach adds an additional step in the cleaning process thereby increasing cleaning time.

To remove a shower/dispersion screen screw of espresso machine for various purposes such as but not limited to: screen cleaning, repair, replacement and so on, typically, a slotted screwdriver or hex wrench tool is used. This requires a person to maintain tool alignment with screen screw while continuously looking under the group head as they turn screw to remove the shower/dispersion screen for cleaning. This process is repeated to reinstall shower/dispersion screen after cleaning the group head. Thus, this process requires a person to constantly look under group head during the shower/dispersion Screen screw removal process which is inconvenient and troublesome for many persons involved in the process.

In order to track the group head cleaning process, a person typically positions his/her head below the group head and then he/she can track the cleaning progress by tilting his/her head at multiple angles to see a somewhat complete view of the group head. This, again, is an inconvenient method to see progress of the cleaning process and could result in strain on the head of the person involved in the tracking of group head cleaning process.

The existing solutions related to group head of espresso machines are ineffective and inefficient in terms of cleaning and related processes. Further, the cleaning of the group head and removing of the shower/dispersion screen screw requires separate tools, thereby, requiring a person to purchase and store separate tools for cleaning of the group head and removing of the shower/dispersion screen screw. The existing solutions require complex multiple tools and involves multiple steps in cleaning espresso machine group head.

In the light of foregoing, there is a need of a multi-purpose, all-in-one, safe, easy to use and quick solution that would allow a person to efficiently and effectively clean the group head of the espresso machine, remove/reinstall a shower/dispersion screen screw of espresso machine as well as track the cleaning process without requiring a user to move their head under the group head of the espresso machine.

SUMMARY

It is an objective of the present invention to provide a multi-purpose cleaning tool that effectively and efficiently cleans a group head as well as shower/dispersion screen of an espresso machine.

It is an objective of the present invention to provide a multi-purpose cleaning tool that can also be used for removing and reinstalling the shower/dispersion screen screw of espresso machine.

It is an objective of the present invention to provide a multi-purpose cleaning tool that could be used for tracking progress of the cleaning process without requiring person involved in cleaning to bring their head below group head.

It is an objective of the present invention to provide a multi-purpose cleaning tool that reduces risk of a person getting burned during cleaning and ineffective cleaning.

Embodiments of the present invention disclose a multi-purpose cleaning tool for cleaning the group head as well as for removing and reinstalling shower/dispersion screen screw. The multi-purpose cleaning tool comprises a top element having a first side and an opposite second side. A ring brush and a center textile disk cleaning pad are disposed on the first side. A bottom element having a first side, an opposite second side and a central plate is positioned between the first side and the opposite second side. An inspection mirror is removably positioned below the central plate in a cavity. A central hole is positioned substantially above the central plate wherein the central hole holds a hex shaft tool bit. Each of the top element and the bottom element includes a mating arrangement that enables the top element and the bottom element to be removably connected to each other.

In an embodiment, the movement of the multi-purpose cleaning tool relative to the group head includes: longitudinal movement, rotational movement and/or combinations thereof.

Embodiments of the present invention discloses a multi-purpose cleaning tool for cleaning the group head as well as for removing and reinstalling shower/dispersion screen screw of a coffee machine; the multi-purpose cleaning tool comprising: a top element having a first side and an opposite second side; wherein a ring brush and a centre textile disk cleaning pad are disposed on the first side; a bottom element having a first side, an opposite second side and a central plate positioned between the first side and the opposite second side; a central hole positioned substantially above the central plate; wherein the central hole is configured to removably hold a hex shaft tool bit.

In an embodiment, each of the top element and the bottom element includes a mating arrangement that enables the top element and the bottom element to be removably connected to each other.

In an embodiment, the top element includes a threaded element A and the bottom element comprises a threaded element A configured to screwably engage against each other when the top element is connected to the bottom element.

In an embodiment, the centre textile disk cleaning pad is removably positioned in the central aperture by an attachment means.

In an embodiment, the attachment means is selected from group consisting of: Velcro fasteners, adhesives, epoxy resins, magnetic couplings and friction locks.

In an embodiment, an inspection mirror is removably positioned below the central plate in a cavity.

In an embodiment, the ring brush is formed from a plurality of bristles disposed along periphery of the first side.

In an embodiment, the ring brush is removably coupled to the top element.

In an embodiment, the top element and/or the bottom element comprises a grip handle configured to be grasped by hands of a person.

In an embodiment, the multi-purpose cleaning tool is substantially made of metallic element.

In an embodiment, the central hole comprises a magnetic element configured to be magnetically coupled to the ferromagnetic hex shaft tool bit.

In an embodiment, the hex shaft tool bit is screwably connected to the central hole.

In an embodiment, the cross sectional shape of the multi-purpose cleaning tool is substantially circular.

In an embodiment, a Plurality of radial ribs are positioned substantially above the central plate to provide reinforcement to the central hole.

Embodiments of the present invention discloses a method of cleaning a group head and a shower/dispersion screen of a coffee machine by using a multi-purpose cleaning tool, the method comprising the steps of:

Step (a) Positioning the multi-purpose cleaning tool such that a first side of a top element of the multi-purpose cleaning tool is positioned close to the group head;

Step (b) Performing cleaning of the group head and/or the shower/dispersion screen of the coffee machine by rotating the multi-purpose cleaning tool in a specific direction such that a plurality of bristles of a ring brush of the multi-purpose cleaning tool contacts the group head of the coffee machine; and a centre textile disk cleaning pad of the multi-purpose cleaning tool contacts the shower/dispersion screen of the coffee machine;

Step (c) Inverting the multi-purpose cleaning tool such that an inspection mirror disposed on an opposite second side of a bottom element is positioned adjacent to the group head;

Step (d) Visually inspecting cleanliness of the group head and/or shower/dispersion screen by a user using the inspection mirror;

Step (e) Inverting back the multi-purpose cleaning tool such that the first side of the top element of the multi-purpose cleaning tool is positioned close to the group head;

Step (f) Repeating cleaning of the group head and/or the shower/dispersion screen of the coffee machine by rotating the multi-purpose cleaning tool in a specific direction such that a plurality of bristles of the ring brush of the multi-purpose cleaning tool contacts the group head of the coffee machine; and the centre textile disk cleaning pad of the multi-purpose cleaning tool contacts the shower/dispersion screen of the coffee machine.

In an embodiment, the method of cleaning a group head and a shower/dispersion screen of a coffee machine by using a multi-purpose cleaning tool comprising the additional steps of: repeating above step c-step f of claim until the group head and shower/dispersion screen of the coffee machine are effectively cleaned by the multi-purpose cleaning tool.

In an embodiment, the method comprising the additional steps of: disassembling the multi-purpose cleaning tool to bring a bottom element of the multi-purpose cleaning tool in use; positioning the bottom element closer to the group head; engaging a hex shaft tool bit positioned in a central hole of the bottom element against the shower/dispersion Screen screw. Rotating the bottom element in a specific direction such that the hex shaft tool bit rotates the Shower/Dispersion Screen screw, thereby removing the shower/dispersion screen screw from the group head.

The present invention provides a multi-purpose cleaning tool for cleaning the group head as well as for removing and reinstalling Shower/Dispersion Screen screw of an espresso machine. These and other features and advantages of the present invention will become apparent from the detailed description below, in light of the accompanying drawings

DETAILED DESCRIPTION

Before describing the present invention in detail, it should be observed that the present invention utilizes a combination of components or processes, which constitutes a multi-purpose cleaning tool for cleaning group head of an espresso machine. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

The multi-purpose cleaning tool will now be described with reference to the accompanying drawings, particularly FIGS. 1A-5.

Figure 1A:
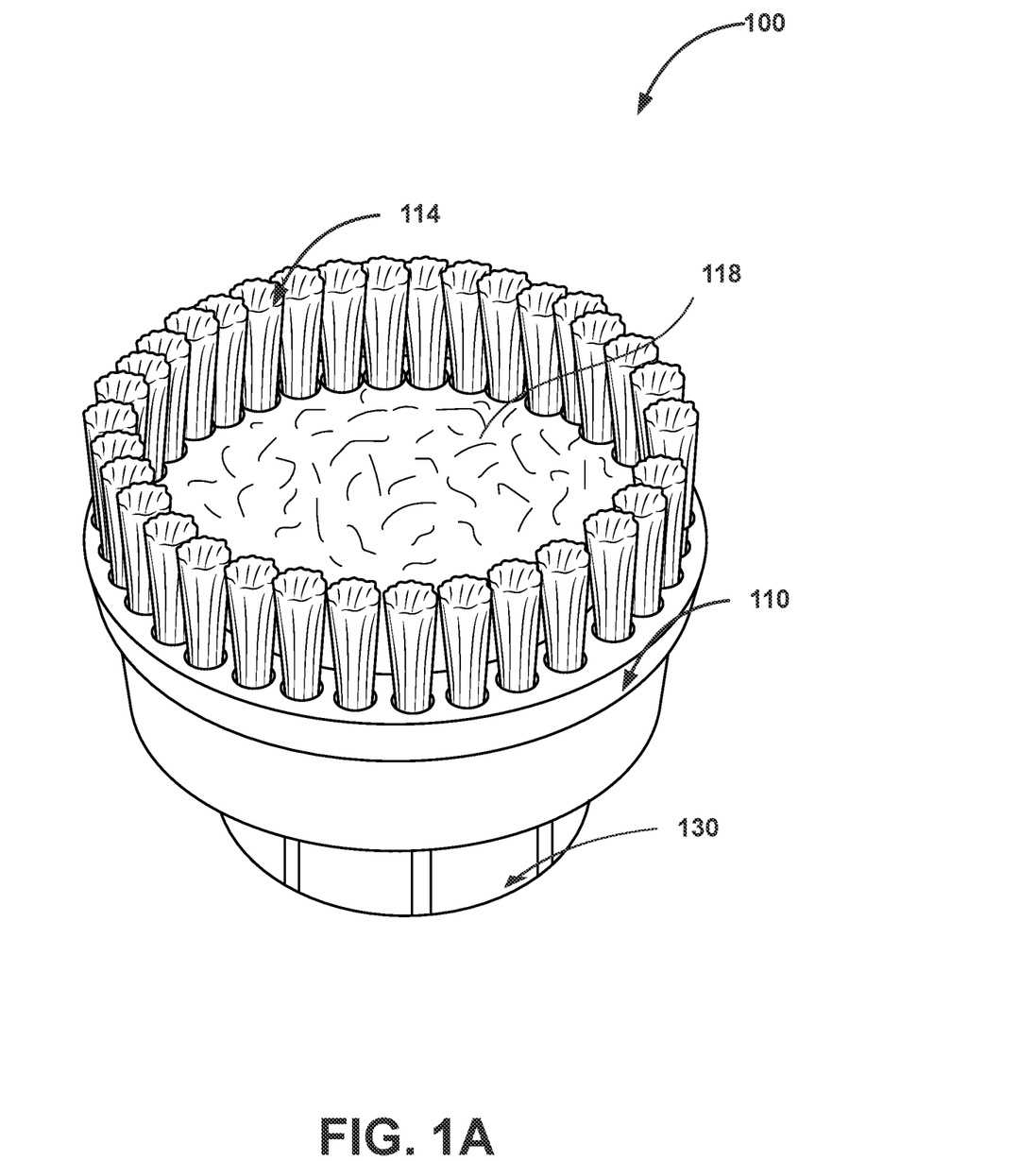
FIG. 1A and FIG. 1B shows a first perspective view and a second perspective view of a multi-purpose cleaning tool respectively, according to an embodiment of the invention.
Figure 1B:
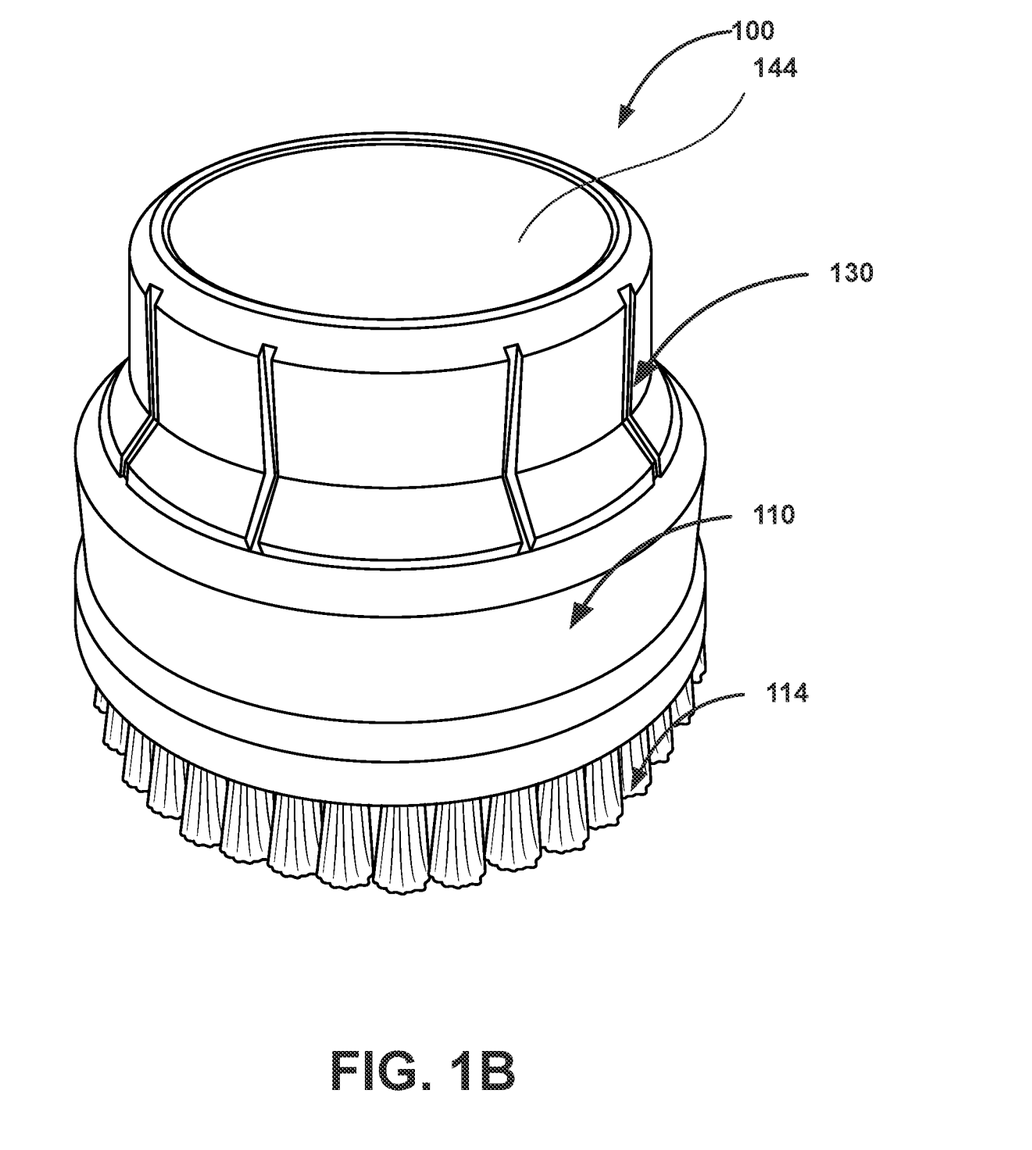
Figure 2:
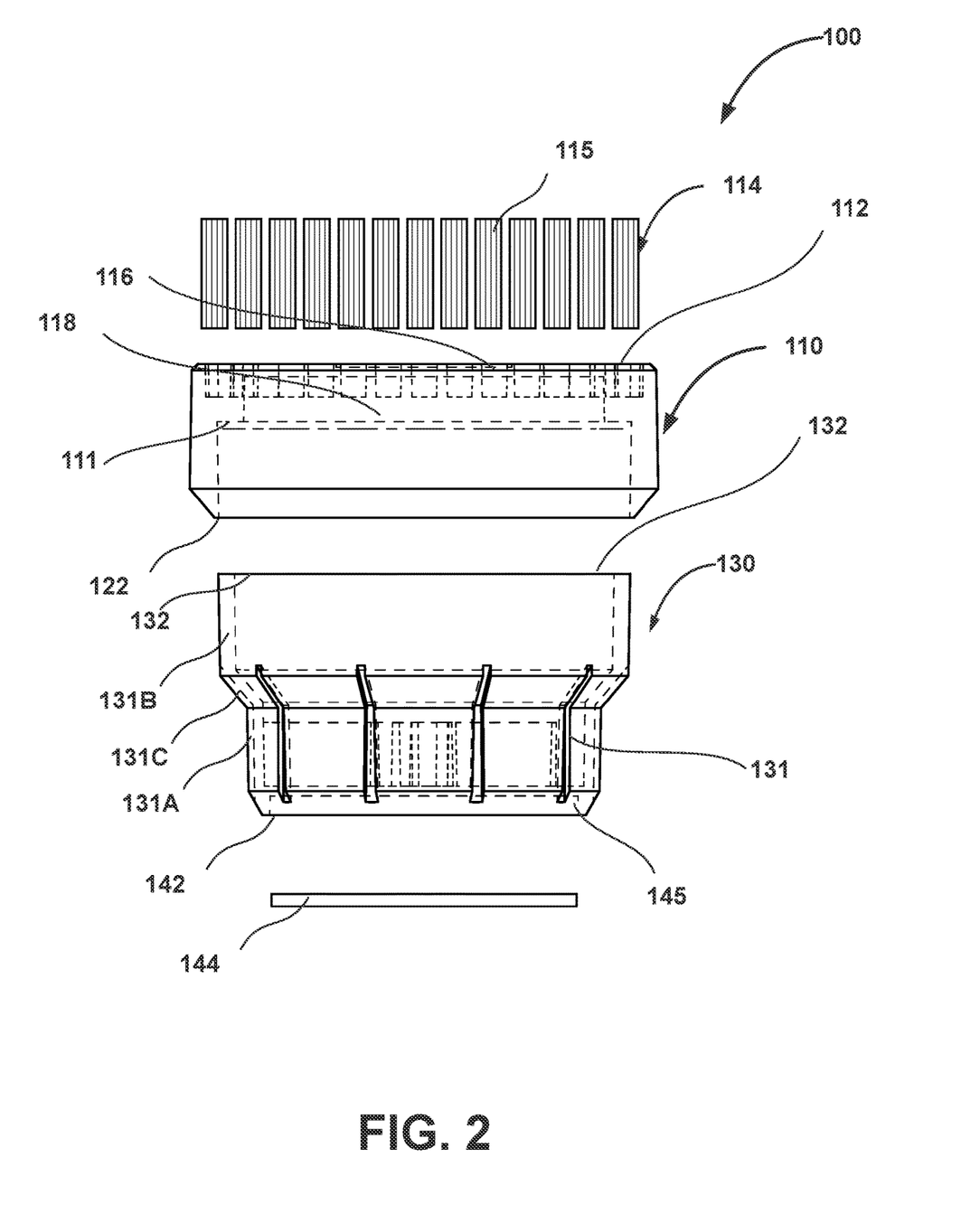
FIG. 2 shows an exploded view of the multi-functional cleaning tool of FIG. 1A.

FIG. 1A and FIG. 1B illustrates a first perspective view and a second perspective view of the multi-purpose cleaning tool 100 respectively, according to an embodiment of the invention. FIG. 1B shows an inverted state of the multi-purpose cleaning tool 100 of FIG. 1A. The multi-purpose cleaning tool 100 is configured to be used for cleaning a group head 200 (FIG. 5) of the espresso machine (not shown in figures). The multi-purpose cleaning tool 100 comprises a top element 110 and a bottom element 130 which will be described in greater detail in the below description accompanying figures. The cross sectional shape of the multi-purpose cleaning tool 100 is substantially circular. In various embodiments (not shown in figures), the multi-purpose cleaning tool 100 could have any other shape of cross section, including but not limited to: rectangle, square, hexagonal, triangle and so on.

Figures 3A, 3B:
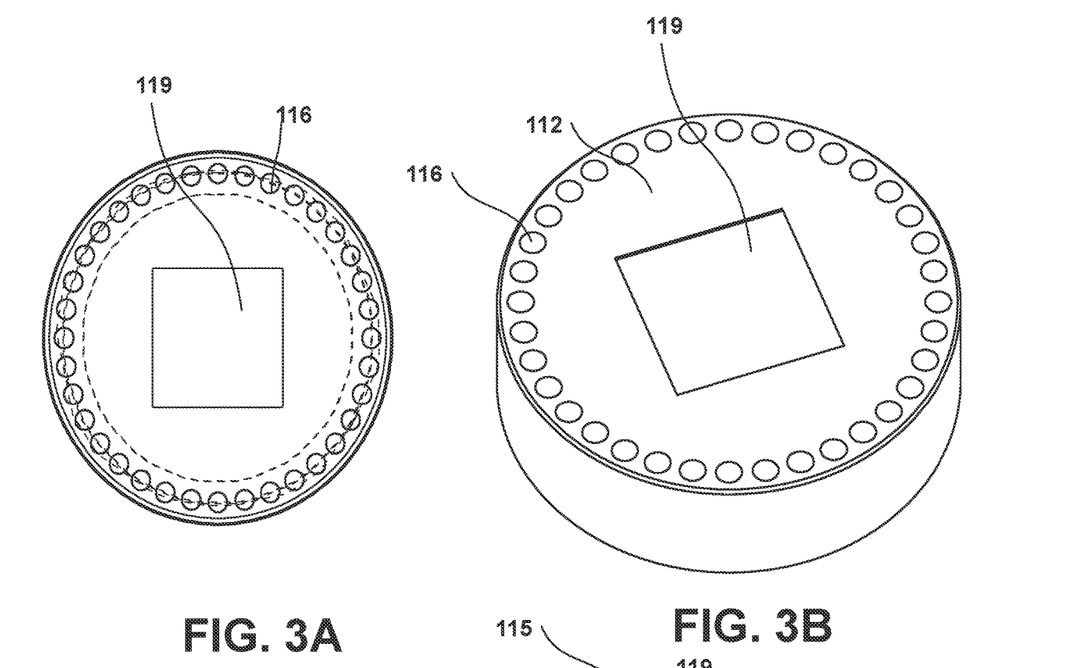
FIG. 3A, FIG. 3B, FIG. 3C and FIG. 3D are a top view, a front perspective view, a side view and a cross-sectional view of the top element of FIG. 2 respectively.
Figures 3C, 3D:
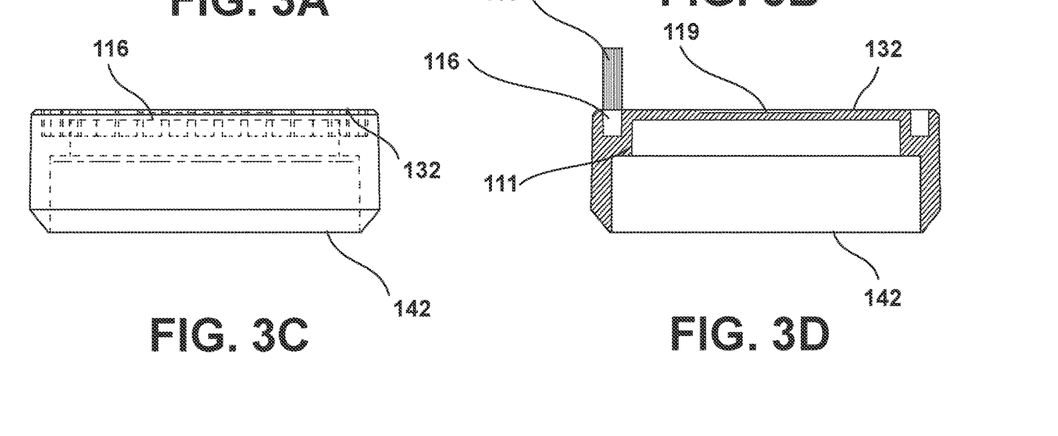
Figure 3E:
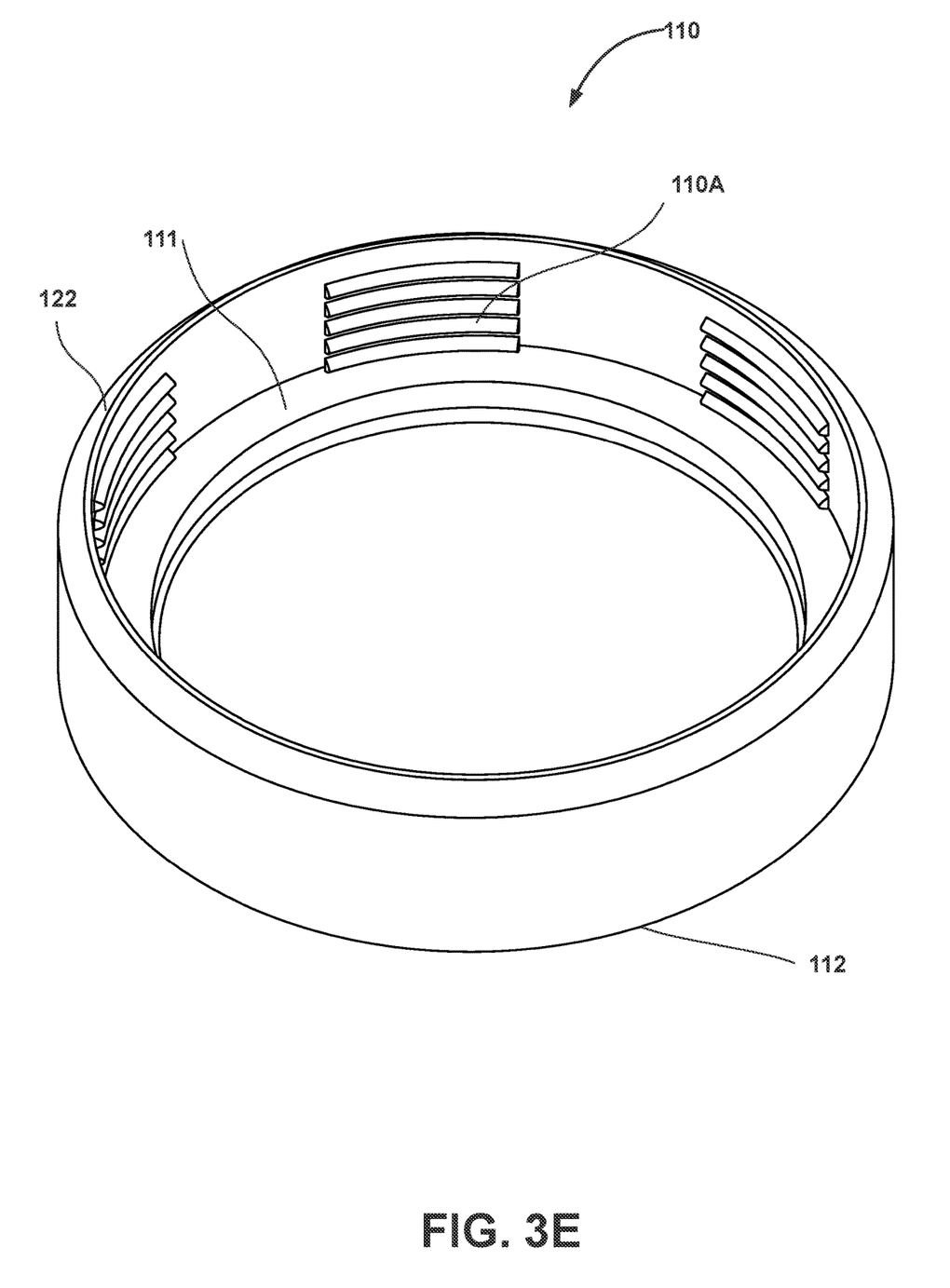
FIG. 3E shows a back perspective view of the top element of the FIG. 3B.
Figure 4A:
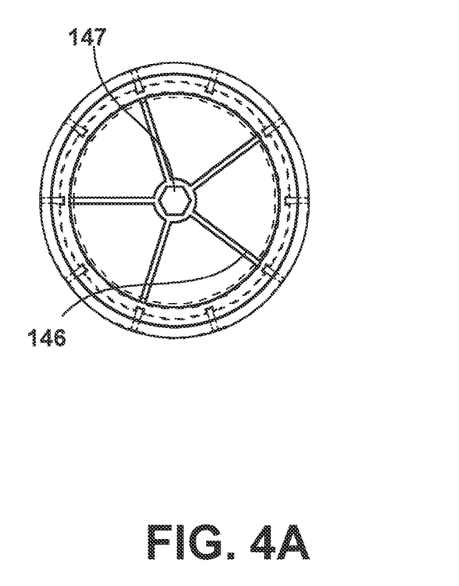
FIG. 4A, FIG. 4B, FIG. 4C and FIG. 4D are a top view, a front perspective view, a side view and a cross-sectional view of the bottom element of the FIG. 2 respectively.

Referring to FIG. 2-FIG. 4E, the top element 110 comprises a first side 112 and an opposite second side 122. A ring brush 114 and a centre textile disk cleaning pad 118 are disposed on the first side 112. The ring brush 114 is formed from a plurality of bristles 115 disposed along periphery of the first side 112. The plurality of bristles 115 are received in a plurality of holes 116 wherein the holes 116 are arranged in a predefined pattern. The pattern could include but not limited to: circular pattern, hexagonal pattern, and so on. Each bristle 115 is received in a hole 116 located in the top element 110. The bristles 115 include any preferred material, for example, nylon, rubber, textile, brass or other material, and they may be as stiff or as soft as desired. The ring brush 114 is configured to clean group head 200 (FIG. 5) due to cleaning action of the bristles 115. The centre textile disk cleaning pad 118 is configured to clean the shower/dispersion screen 210 (FIG. 5). The centre textile disk cleaning pad 118 is made of a material including but not limited to: sponge, rubber, textiles and so on. The bottom element 130 comprises a first side 132 and an opposite second side 142. The bottom element 130 comprises a small diameter portion 131A, a large diameter portion 131B and a tapered portion 131C disposed between the large diameter portion 131B and the small diameter portion 131A. An inspection mirror 144 is disposed on the second side 142 and the inspection mirror 144 is made of a reflective material including but not limited to: glass, mylar, chrome plating, silver and/or combinations thereof. The inspection mirror 144 facilitates group head 200 (FIG. 5) cleanliness inspection during cleaning process. The inspection mirror 144 provides more visibility to parts and surfaces of group head 210 than direct viewing through body and head positioning of a person involved in cleaning process. The person involved in cleaning can see the inspection mirror 144 to track the cleaning progress of the group head 200 (FIG. 5) without moving their head below the group head 200. Further, the bottom element 130 comprises a plurality of grooves 131 disposed at least partially on the outer surface of the small diameter portion 131A and the tapered portion 131C of the bottom element 130. The plurality of grooves 131 provides a gripping surface for multi-purpose cleaning tool 100 such that the hands of the person involved in cleaning process will not accidentally slip during cleaning process due to plurality of grooves 131 disposed at least partially on the outer surface of the small diameter portion 131A and the tapered portion 131C of the bottom element 130. Each of the top element 110 and the bottom element 130 includes a mating arrangement that enables the top element 110 and the bottom element 130 to be removably connected to each other. The top element 110 is substantially hollow to permit insertion of large diameter portion 131B in the top element 110 when the top element 110 and the bottom element 130 are removably connected to each other. The top element 110 comprises a stepped portion 111 that acts as a shoulder stop to retain the top element 110 against the bottom element 130 such that the first side 132 of the bottom piece 130 at least partially contacts the stepped portion 111 of the top element 110.

Figure 4B:
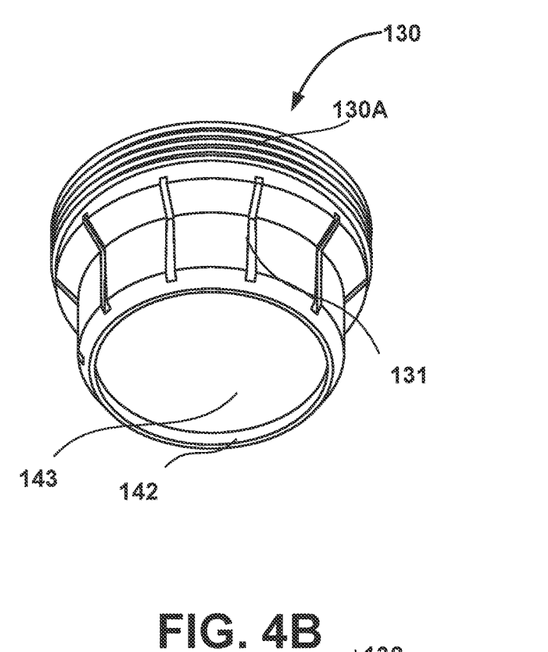
Figures 4C, 4D:
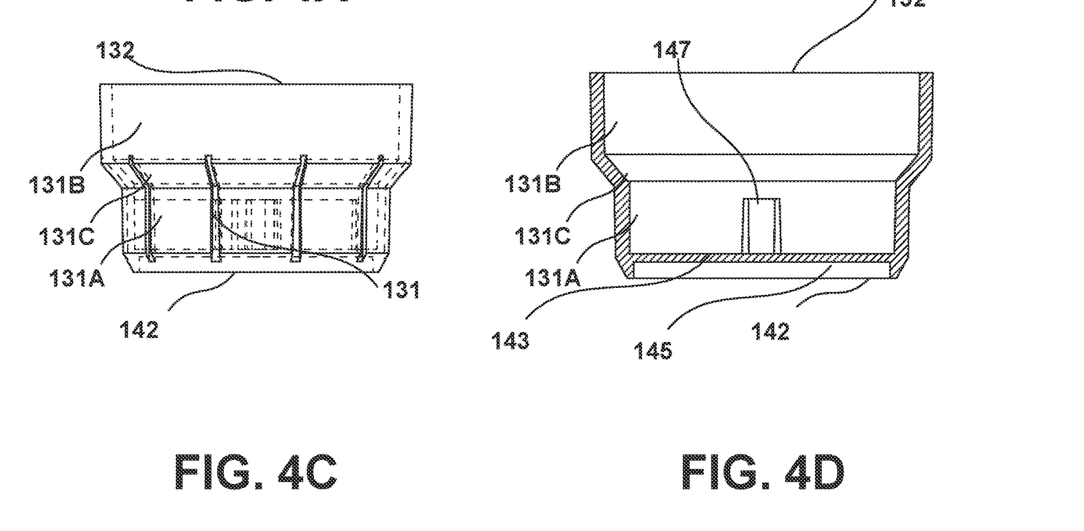
Figure 4E:
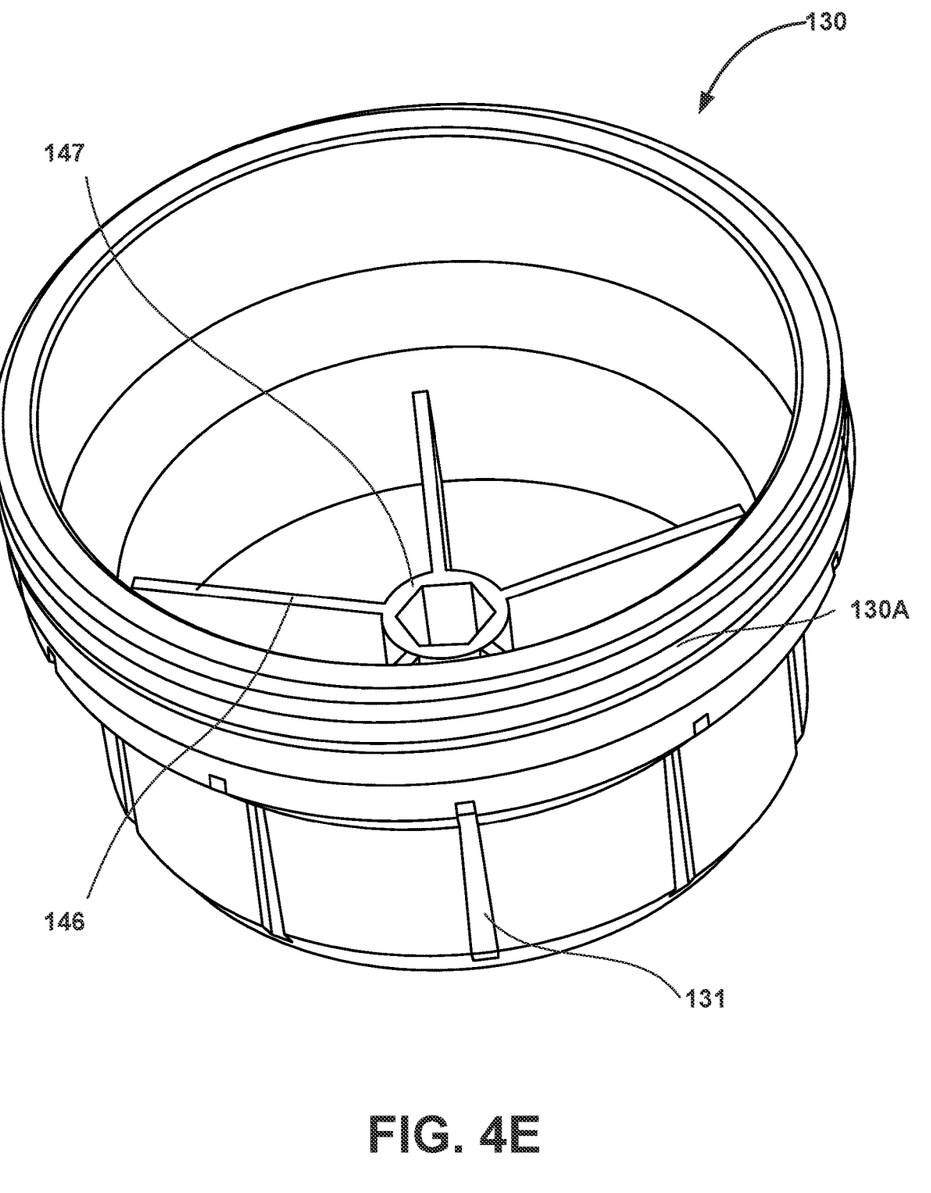
FIG. 4E shows a back perspective view of the bottom element of the FIG. 4B.
Figure 5:
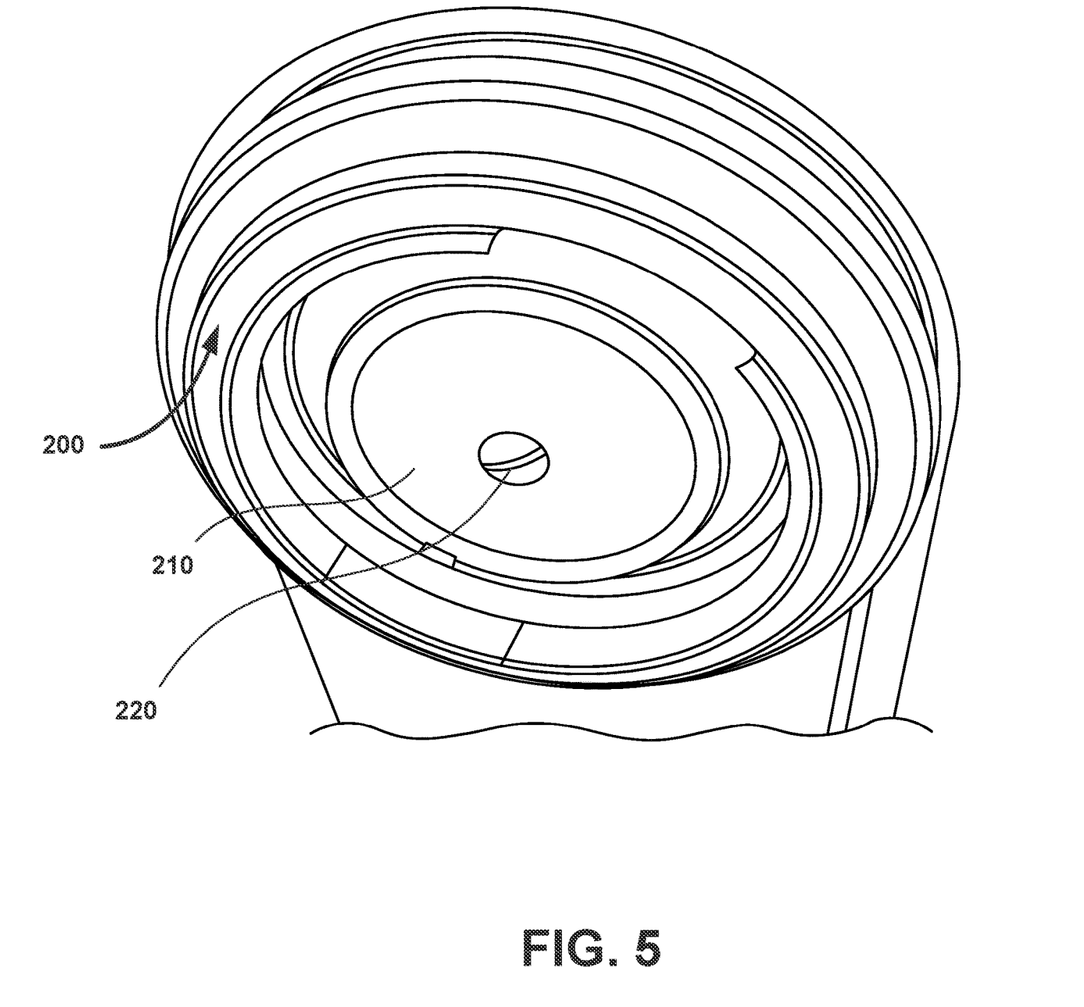
FIG. 5 shows a shows a group head assembly of a typical espresso machine known in prior art.

In another embodiment as shown in FIG. 3E, FIG. 4B and FIG. 4E, the top element 110 includes a threaded element 110A and the bottom element 130 comprises a threaded element 130A. The threaded element 110A and the threaded element 130A are screwably engaged against each other when the top element 110 is connected to the bottom element 130.

In an embodiment (not shown in figures), the top element 110 includes a taper element 110B (not shown in figures) and the bottom element 130 comprises a taper element 130B (not shown in figures). The taper element 110B (not shown in figures) and the taper element 130B (not shown in figures) are taper-fittingly engaged against each other when the top element 110 is connected to the bottom element 130.

In an embodiment (not shown in figures), the ring brush 114 comprises a retainer element 115A (not shown in figures) shaped in form of a circular ring. The retainer element 115A (not shown in figures) is attached to each of the plurality of bristles 115. The retainer element 115A (not shown in figures) effectively provides a mounting surface for the plurality of bristles 115 such that the plurality of bristles 115 are effectively secured in place during cleaning due to the design configuration of the retainer element 115A (not shown in figures).

In an embodiment (not shown in figures), the ring brush 114 is removably coupled to the top element 110. This configuration allows easy replacement of ring brush 114 when the plurality of bristles 115 are worn out due to prolonged use.

In another embodiments (nor shown in figures), the removable connection between the top element 110 and the bottom element 130 is achieved by an attachment mechanism (not shown in figures) including but not limited to: snap-fit couplings, friction-fit couplings, magnetic couplings, luer-locks, elastic couplings, keys and keyways, pins, key-locks and so on.

In another embodiment (not shown in figures), at least one of the top element 110 and the bottom element 130 comprises a grip handle (not shown) configured to be grasped by hands of a person. The grip handle (not shown) is made of a suitable material including but not limited to: silicon, rubber, leather, plastic and so on.

Referring to FIG. 2, FIG. 3A, FIG. 3B and FIG. 3C, the first side 112 of the top element 110 comprises a plurality of holes 116 to receive the plurality of bristles 115. As seen in FIG. 3A and FIG. 3B, the holes 116 are arranged in a circular pattern such that the holes 116 are arranged continuously in complete 360 degrees in the top element 110. However, other patterns could also be envisioned including but not limited to: hexagonal pattern, array pattern and so on. The first side 112 further comprises a central aperture 119 to receive the centre textile disk cleaning pad 118. The shape of the central aperture 119 and the centre textile disk cleaning pad 118 is substantially square as seen in FIG. 3A and FIG. 3B. However, other shapes of the central aperture 119 and the centre textile disk cleaning pad 118 could be envisioned including but not limited to: circle, rectangle, triangle and so on. The centre textile disk cleaning pad 118 is removably positioned in the central aperture 119 by an attachment means (not shown in figures). The attachment means can include but not limited to: Velcro fasteners, adhesives, epoxy resins, magnetic couplings, friction locks and so on. When the centre textile disk cleaning pad 118 is worn out, it could be replaced by another new centre textile disk cleaning pad 118. Further, the centre textile disk cleaning pad 118 could be replaced depending on the dirt residue on shower/dispersion screen 210, material and geometry of the shower/dispersion screen 210.

In an embodiment (not shown in figures), the holes 116 are arranged in a non continuous circular pattern such that the holes 116 are arranged in 180 degrees in the top element 110 and remaining 180 degree portion of the top element 110 does not comprises any holes 116. In another embodiment (not shown in figures), the holes 116 are arranged in small discrete sections in the top element 110 i.e. 30 degrees, 60 degrees, 90 degrees and so on.

Referring to FIG. 2 and FIGS. 4A-4E, the small diameter portion 131A of the bottom element 130 comprises a central plate 143. The central plate 143 is positioned between the first side 132 and the opposite second side 142. The inspection mirror 144 is removably positioned below the central plate 143 in a cavity 145. The cavity 145 is substantially circular in shape and is formed due to configuration of the central plate 143 and the second side 142 as seen in FIG. 4B. The shape of the inspection mirror 144 and the cavity 145 is substantially circular as seen in FIG. 4A and FIG. 4B. However, other shapes of the inspection mirror 144 and the cavity 145 could be envisioned including but not limited to: square, rectangle, triangle and so on. A Plurality of radial ribs 146 extend radially from a central hole 147 towards the periphery of the small diameter portion 131A. The Plurality of radial ribs 146 are positioned substantially above the central plate 143 and provide reinforcement to the central hole 147. The central hole 147 is positioned substantially above the central plate 143 and the central hole 147 holds a hex shaft tool bit 148 (not shown) to achieve removal of Shower/Dispersion Screen screw 220. The hex shaft tool bit 148 (not shown) is configured to be used for removing and reinstalling Shower/Dispersion Screen screw 220 (FIG. 5). The hex shaft tool bit 148 (not shown) is easily replaceable/detachable and could come in various sizes and shapes to suit different sizes and types of Shower/Dispersion Screen screw 220 (FIG. 5) of a typical espresso machine (not shown in figures).

In an embodiment, the central hole 147 comprises a magnetic element (not shown in figures). A hex shaft tool bit 148 comprising at least one ferromagnetic material is magnetically coupled to the magnetic element (not shown in figures) of the central hole 147. Further, the hex shaft tool bit 148 comprising at least one ferromagnetic material can be removed from the magnetic element (not shown in figures) of the central hole 147 by applying a force sufficient to overcome the magnetic force generated by the central hole 147 and the hex shaft tool bit 148.

In an embodiment, the hex shaft tool bit 148 (not shown) is frictionally inserted in the central hole 147. In another embodiment, the hex shaft tool bit 148 (not shown) is screwably connected to the central hole 147.

In various embodiments, the removable connection between the hex shaft tool bit 148 (not shown) and the central hole 147 is achieved by a mechanism including but not limited to: luer locks, keys and keyways, pins, key-locks and so on.

An exemplary method of using the multi-purpose cleaning tool 100 on a typical espresso machine (not shown in figures) will be described in reference to FIGS. 1A-5.

Firstly, the multi-purpose cleaning tool 100 is positioned substantially below the group head 200 such that the first side 112 of the top element 110 is positioned close to the group head 200. As seen in FIG. 5, the group head 200 comprises a shower/dispersion screen 210 and a Shower/Dispersion Screen screw 220. The ring brush 114 comprises a plurality of bristles 115 disposed along periphery of the first side 112. Afterwards, the multi-purpose cleaning tool 100 is rotated in a direction (i.e. Clockwise, counter-clockwise or combination) such that the plurality of bristles 115 contact the group head 200 and the centre textile disk cleaning pad 118 contacts the shower/dispersion screen 210. Thus, the group head 200 and/or shower/dispersion screen 210 is cleaned effectively due to rotating and/or sliding motion of the multi-purpose cleaning tool 100. Further, it should be obvious to the one skilled in the art that the cleaning of the group head 200 and/or shower/dispersion screen 210 could also be performed by sliding the multi-purpose cleaning tool 100 relative to the group head 200 such that plurality of bristles 115 contact the group head 200 and the centre textile disk cleaning pad 118 contacts the shower/dispersion screen 210. Overall, broadly speaking, the cleaning of the group head 200 and/or shower/dispersion screen 210 could be performed due to: rotational movement, sliding movement and/or combination thereof of the multi-purpose cleaning tool 100. Further, the multi-purpose cleaning tool 100 could be inverted (i.e. Rotated by 180 degrees) such that the inspection mirror 144 is positioned adjacent to the group head 200. The inspection mirror 144 facilitates group head 200 cleanliness inspection during cleaning process. The person involved in cleaning sees the inspection mirror 144 to track the cleaning progress of the group head 200 without moving their head below the group head 200. Thus, a person involved in cleaning can position their head and eyes above the group head 200 and track the cleaning progress of the group head 200 using the inspection mirror 144.

To remove a shower/dispersion screen screw 220 of espresso machine (not shown in figures) for various purposes such as but not limited to: screen cleaning, repair, replacement and so on, the multi-purpose cleaning tool 100 is disassembled by separating the top element 110 from the bottom element 130. Afterwards, the bottom element 130 as seen in FIG. 4E is used to remove a Shower/Dispersion Screen screw 220. After disassembly of the multi-purpose cleaning tool 100, the bottom element 130 as seen in FIG. 4E is brought closer to the group head 200 and the top element 110 is stored in a safe location for later use. Then, the hex shaft tool bit 148 (not shown) positioned in the central hole 147 is engaged against the Shower/Dispersion Screen screw 220. Afterwards, the bottom element 130 is rotated in a first direction against the group head 200 such that the hex shaft tool bit 148 (not shown) rotates the Shower/Dispersion Screen screw 220, thereby removing the Shower/Dispersion Screen screw 220. After removing the Shower/Dispersion Screen screw 220, a person can further remove various stacked parts of group head 200 such as screen and so on to perform various tasks such as but not limited to: screen cleaning, repair, replacement and so on.

When it is desired to reinstall the shower/dispersion screen screw 220, most of the above steps are merely performed in a reverse order. Then, person stacks all removed parts in the group head 200. Afterwards, hex shaft tool bit 148 (not shown) positioned in the central hole 147 is aligned against the Shower/Dispersion Screen screw 220. Afterwards, the bottom element 130 is rotated in an opposite second direction against the group head 200 such that the hex shaft tool bit 148 (not shown) rotates the Shower/Dispersion Screen screw 220, thereby reinstalling the Shower/Dispersion Screen screw 220 on the group head 200.

The multi-purpose cleaning tool 100 of the present invention is primarily used for cleaning group head multi-purpose cleaning tool 200 of a typical espresso machine. However, it should be obvious to the one skilled in the art that the multi-purpose cleaning tool 100 could be used for other purposes involving cleaning such as but not limited to: coffee machines, vehicle cleaning, filter cleaning, dust cleaning brush, bath brush, oven cleaning and so on. Broadly speaking, the multi-purpose cleaning tool 100 could be used to serve any purpose related to cleaning a surface having dirt residue on it.

In an embodiment, the multi-purpose cleaning tool 100 of the present invention is substantially made of metals/metal alloys such as but not limited to: steel, aluminium, copper, iron and so on. Obviously, the plurality of bristles 115 could be made from any preferred material, for example, nylon, rubber, textile, brass or other material, and they may be as stiff or as soft as desired.

In another embodiment, majority of the multi-purpose cleaning tool 100 of the present invention is substantially made of non-metals such as but not limited to: plastics, wood, ceramics and so on. Further, it should be understood that the material of the multi-purpose cleaning tool 100 is non-limiting and should not be construed as limiting factor in defining the scope of the present invention.

It should be obvious that the after cleaning of the group head 200, the multi-purpose cleaning tool 100 could itself be washed by a cleaning liquid such as soap solution, detergent, water etc. Further, it should be obvious to the one skilled in the art that the term "group head" includes various parts associated with group head typically found in a conventional espresso machine such as but not limited to: group head gasket, paper seals, O-rings, shower screen and so on. The term "cleaning of group head" broadly includes cleaning of various parts of the "group head" which could be accessed by the multi-purpose cleaning tool 100.

Although particular embodiments of the invention have been described in detail for purposes of illustration, various modifications and enhancements may be made without departing from the spirit and scope of the invention.

What is claimed is:

1. A multi-purpose cleaning tool (100) for cleaning a group head (200) as well as for removing and reinstalling a shower/dispersion screen screw (220) of a coffee machine; the multi-purpose cleaning tool (100), comprising:
    a top element (110) having a first side (112) and an opposite second side (122), wherein a ring brush (114) and a centre textile disk cleaning pad (118) are disposed on the first side (112);
    a bottom element (130) having a first side (132), an opposite second side (142) and a central plate (143) positioned between the first side (132) and the opposite second side (142);
    a central hole (147) positioned substantially above the central plate (143), wherein the central hole (147) is configured to removably hold a hex shaft tool bit (148); and
    a plurality of radial ribs (146) positioned substantially above the central plate (143) to provide reinforcement to the central hole (147).

2. The multi-purpose cleaning tool (100) of claim 1, wherein the top element (110) and the bottom element (130) includes a mating arrangement (130) that enables the top element (110) and the bottom element (130) to be removably connected to each other.

3. The multi-purpose cleaning tool (100) of claim 1, wherein the top element (110) includes a first threaded element (110A), and the bottom element (130) comprises a second threaded element (130A) configured to screwably engage against each other when the top element (110) is connected to the bottom element (130).

4. The multi-purpose cleaning tool (100) of claim 1, wherein the centre textile disk cleaning pad (118) is removably positioned in a central aperture (119) by an attachment means.

5. The multi-purpose cleaning tool (100) of claim 4, wherein the attachment means is selected from group consisting of: velcro fasteners, adhesives, epoxy resins, magnetic couplings and friction locks.

6. The multi-purpose cleaning tool (100) of claim 1 further comprising an inspection mirror (144) is removably positioned below the central plate (143) in a cavity (145).

7. The multi-purpose cleaning tool (100) of claim 1, wherein the ring brush (114) is formed from a plurality of bristles (115) disposed along the periphery of the first side (112).

8. The multi-purpose cleaning tool (100) of claim 1, wherein the ring brush (114) is removably coupled to the top element (110).

9. The multi-purpose cleaning tool (100) of claim 1, wherein the top element (110) and/or the bottom element (130) comprises a grip handle configured to be grasped by hands of a person.

10. The multi-purpose cleaning tool (100) of claim 1, wherein the multi-purpose cleaning tool (100) is substantially made of metallic element.

11. The multi-purpose cleaning tool (100) of claim 1, wherein the central hole (147) comprises a magnetic element configured to be magnetically coupled to the hex shaft tool bit (148).

12. The multi-purpose cleaning tool (100) of claim 1, wherein the cross sectional shape of the multi-purpose cleaning tool (100) is substantially circular.

\* \* \* \* \*